United States Patent
Kataoka et al.

(10) Patent No.: US 9,459,166 B2
(45) Date of Patent: Oct. 4, 2016

(54) CUTTING RESISTANCE ANALYSIS DEVICE, CUTTING AND MACHINING DEVICE EQUIPPED WITH SAME, AND CUTTING RESISTANCE ANALYSIS PROGRAM

(75) Inventors: Takayuki Kataoka, Hirakata (JP); Ryo Yamaguchi, Hirakata (JP); Noriaki Kojima, Hirakata (JP)

(73) Assignee: KOMATSU LTD., Tokyo (JP)

( * ) Notice: Subject to any disclaimer, the term of this patent is extended or adjusted under 35 U.S.C. 154(b) by 751 days.

(21) Appl. No.: 13/877,177

(22) PCT Filed: Sep. 4, 2012

(86) PCT No.: PCT/JP2012/072491
§ 371 (c)(1),
(2), (4) Date: Apr. 1, 2013

(87) PCT Pub. No.: WO2013/069363
PCT Pub. Date: May 16, 2013

(65) Prior Publication Data
US 2013/0336736 A1 Dec. 19, 2013

(30) Foreign Application Priority Data
Nov. 9, 2011 (JP) .................. 2011-245740

(51) Int. Cl.
*G01L 5/00* (2006.01)
*G06F 19/00* (2011.01)
(Continued)

(52) U.S. Cl.
CPC ........... *G01L 5/0076* (2013.01); *B23Q 15/013* (2013.01); *B23Q 17/0952* (2013.01);
(Continued)

(58) Field of Classification Search
USPC ............. 702/41; 408/12, 158, 180; 409/132, 409/147, 186, 200, 293, 345; 451/10, 11, 451/215, 221; 318/571; 83/72; 73/104
See application file for complete search history.

(56) References Cited

U.S. PATENT DOCUMENTS 4,547,847 A  10/1985 Olig et al.
4,707,793 A  11/1987 Anderson
(Continued)

FOREIGN PATENT DOCUMENTS

DE  33 48 159 C2  12/1992
JP  61095851 A    5/1986
(Continued)

OTHER PUBLICATIONS

International Search Report for PCT/JP2012/072491, dated Nov. 20, 2012.
(Continued)

*Primary Examiner* — Mohammad Ali
*Assistant Examiner* — Md Abul Azad
(74) *Attorney, Agent, or Firm* — Global IP Counselors, LLP

(57) ABSTRACT

A cutting resistance analysis device is adapted to calculate cutting resistance at a plurality of machining points along a path of movement of a multi-blade rotary cutting tool in cutting and machining of a workpiece using the multi-blade rotary cutting tool. The cutting resistance analysis device includes a data storage section, a cutting resistance calculating section, a contact blade count calculating section and a per-blade cutting resistance calculating section. The contact blade count calculating section is configured to calculate a number of blades of the multi-blade rotary cutting tool that are simultaneously in contact with a machining face of the workpiece. The per-blade cutting resistance calculating section is configured to calculate the cutting resistance per blade of the multi-blade rotary cutting tool based on the amount of cutting resistance and a calculation result of the contact blade count calculating section.

7 Claims, 10 Drawing Sheets

(51) Int. Cl.

| | | |
|---|---|---|
| *G01L 1/00* | (2006.01) | |
| *G01L 3/00* | (2006.01) | |
| *G05B 19/25* | (2006.01) | |
| *B23C 3/00* | (2006.01) | |
| *B23C 1/16* | (2006.01) | |
| *B24B 49/00* | (2012.01) | |
| *B23Q 17/09* | (2006.01) | |
| *G05B 19/416* | (2006.01) | |
| *B23Q 15/013* | (2006.01) | |

(52) U.S. Cl.
CPC ....... B23Q17/0966 (2013.01); G05B 19/4166 (2013.01); *G05B 2219/37437* (2013.01); *Y10T 408/173* (2015.01)

(56) References Cited

U.S. PATENT DOCUMENTS

| | | | | |
|---|---|---|---|---|
| 5,827,020 | A * | 10/1998 | Fujita | G05B 19/4163 318/571 |
| 6,533,508 | B1 * | 3/2003 | Nonaka | B23C 3/04 409/132 |
| 6,592,430 | B1 * | 7/2003 | Nakasuji | B23Q 17/22 451/10 |
| 2001/0032533 | A1 * | 10/2001 | Sekiya | B23D 59/002 83/452 |
| 2002/0197122 | A1 * | 12/2002 | Mizutani | G05B 19/4015 409/132 |
| 2007/0011861 | A1 * | 1/2007 | Kosuge | B23B 5/166 29/559 |
| 2007/0278980 | A1 * | 12/2007 | Wilson | G05B 19/25 318/573 |
| 2013/0046405 | A1 * | 2/2013 | Shamoto | G05B 19/404 700/190 |

FOREIGN PATENT DOCUMENTS

| | | |
|---|---|---|
| JP | 5-77138 A | 3/1993 |
| JP | 8-25178 A | 1/1996 |
| JP | 10-113846 A | 5/1998 |
| JP | 2001-154718 A | 6/2001 |

OTHER PUBLICATIONS

The Office Action for the corresponding German application No. 11 2012 000 203.2, issued on May 26, 2015.

"Werkzeugmaschinen: Grundlagen : Lehr- und Übungsbuch" written by Andreas Hirsch, published by Friedrich Vieweg & Sohn Verlag on Mar. 29, 2000 and its partial translation.

* cited by examiner (a)

(b)

CUTTING RESISTANCE ANALYSIS DEVICE, CUTTING AND MACHINING DEVICE EQUIPPED WITH SAME, AND CUTTING RESISTANCE ANALYSIS PROGRAM

CROSS-REFERENCE TO RELATED APPLICATIONS

This application claims priority to Japanese Patent Application No. 2011-245740 filed on Nov. 9, 2011, the disclosure of which is hereby incorporated herein by reference in its entirety.

FIELD OF THE INVENTION

The present invention relates to a cutting resistance analysis device that uses a multi-blade tool to perform machining, and to a cutting and machining device equipped with this device, and to a cutting resistance analysis program.

BACKGROUND ART

Cutting work using a rotary cutting tool has been performed in the past in order to cut and machine a workpiece into the desired shape.

For example, Japanese Laid-Open Patent Application H8-25178 (laid open on Jan. 30, 1996) discloses a method for cutting with a rotary cutting tool, which has the effect of extending the service life of the rotary cutting tool and making the cutting and machining processing more efficient, by detecting in a cutting resistance detection step the cutting resistance applied to the rotary cutting tool from the workpiece, and adjusting the rate of movement of the rotary cutting tool so that the amount of cutting resistance remains substantially constant.

Further, Japanese Laid-Open Patent Application H10-113846 (laid open on May 6, 1998) discloses a cutting method with which cutting resistance can be kept substantially constant while the tool rotational speed and the feed rate are each kept constant, by performing pre-cutting prior to finish cutting so that the cutting volume at a given cutting rotational speed on a three-dimensional curved surface is substantially constant or gradually decreases.

SUMMARY

However, the following problems were encountered with the above-mentioned conventional cutting resistance analysis devices.

Specifically, with the cutting resistance analysis device disclosed in the above publications, the feed rate of the rotary cutting tool, etc., is adjusted by taking into account the amount of cutting resistance exerted on the entire rotary cutting tool, regardless of whether it is a multi-blade tool or a single-blade tool such as a lathe.

Accordingly, in a cutting step using a multi-blade tool, the cutting resistance exerted per blade cannot be accurately ascertained, so there is the risk that problems will occur. For example, when preventing blade damage is considered, loss may occur in the cutting step because the feed rate cannot be increased sufficiently, and when cutting efficiency is considered, the feed rate may be raised so high that the cutting resistance per blade increases and the blade is damaged.

It is an object of the present invention to provide a cutting resistance analysis device with which damage to a multi-blade tool can be effectively prevented while the machining efficiency can be increased in the cutting and machining step, as well as a cutting and machining device equipped with the same, and a cutting resistance analysis program.

The cutting resistance analysis device pertaining to the first aspect is cutting resistance analysis device that calculates cutting resistance at a plurality of machining points along the path of movement of a multi-blade rotary cutting tool in the cutting and machining of a workpiece using the multi-blade rotary cutting tool, said device comprising a data storage section, a cutting resistance calculating section, a contact blade count calculating section, and a per-blade cutting resistance calculating section. The data storage section stores data related to the shape of the multi-blade rotary cutting tool, the number of blades, and the shape of the workpiece. The cutting resistance calculating section calculates the amount of cutting resistance exerted on the multi-blade rotary cutting tool. The contact blade count calculating section calculates the number of blades of the multi-blade rotary cutting tool that are simultaneously in contact with the machining face of the workpiece. The per-blade cutting resistance calculating section calculates the cutting resistance per blade of the multi-blade rotary cutting tool on the basis of the amount of cutting resistance and the calculation result of the contact blade count calculating section.

Here, the amount of cutting resistance per blade is calculated on the basis of the amount of cutting resistance at the contact portion, the number of blades of the multi-blade rotary cutting tool subjected to cutting resistance, and so forth in the cutting and machining of a workpiece using a multi-blade rotary cutting tool having a plurality of blades.

The amount of cutting resistance per blade here may be calculated at a specific machining point according to the shape of the workpiece, etc., or may be calculated at a plurality of points along the path of movement of the multi-blade rotary cutting tool. That is, when the workpiece has a simple shape, there is almost no change in the amount of cutting resistance, so the cutting resistance per blade may be calculated at a single machining point, and when the workpiece has a complex shape, the cutting resistance per blade may be calculated at a plurality of machining points at which the amount of cutting resistance varies.

Consequently, in a cutting and machining step using a multi-blade rotary cutting tool, the feed rate of the multi-blade rotary cutting tool can be raised or lowered on the basis of the amount of cutting resistance per blade, thereby effectively preventing damage to the blades of the multi-blade rotary cutting tool, while also improving the machining efficiency in the cutting and machining step.

The cutting resistance analysis device pertaining to the second aspect is the cutting resistance analysis device pertaining to the first aspect, further comprising a cutting removal volume calculating section that uses the various kinds of data stored in the data storage section to calculate the volume of cutting removal by the multi-blade rotary cutting tool at a specific machining point along the path of the multi-blade rotary cutting tool. The cutting resistance calculating section calculates the amount of cutting resistance exerted on the multi-blade rotary cutting tool on the basis of the specific cutting resistance that is inherent to the workpiece and the cutting removal volume calculated by the cutting removal volume calculating section.

The cutting resistance analysis device pertaining to the third aspect is the cutting resistance analysis device pertaining to the first or second aspect, wherein the contact blade count calculating section calculates the number of blades of the multi-blade rotary cutting tool that are simultaneously in contact with the machining face of the workpiece on the basis of the outermost arc length at the contact portion between the multi-blade rotary cutting tool and the workpiece.

The cutting resistance analysis device pertaining to the fourth aspect is the cutting resistance analysis device pertaining to any of the first to third aspects, wherein the per-blade cutting resistance calculating section calculates the cutting resistance per blade at a plurality of machining points disposed at substantially regular intervals along the path of the multi-blade rotary cutting tool.

Here, the amount of cutting resistance per blade is calculated at a plurality of machining points disposed at substantially regular intervals along the path of the multi-blade rotary cutting tool.

Consequently, even when cutting and machining a workpiece with a complex shape, the amount of cutting resistance at machining points can be recognized even if the cutting resistance varies greatly, by calculating the cutting resistance at each of the machining points. Thus, when the result of analyzing this cutting resistance is used to perform cutting and machining, for example, the feed rate of the multi-blade rotary cutting tool can be raised or lowered on the basis of the amount of cutting resistance at the various machining points.

The cutting resistance analysis device pertaining to the fifth aspect is the cutting resistance analysis device pertaining to any of the first to fourth aspects, further comprising a cutting resistance interpolation section that calculates by linear interpolation the cutting resistance per blade between machining points on the basis of the amount of cutting resistance per blade at a specific machining point calculated by the per-blade cutting resistance calculating section and the amount of cutting resistance per blade at a machining point adjacent thereto.

Here, the amount of cutting resistance per blade between machining points is calculated by linear interpolation on the basis of the amount of cutting resistance per blade at a specific machining point along the path of movement of the multi-blade rotary cutting tool and the amount of cutting resistance per blade at a machining point adjacent thereto.

Consequently, the amount of cutting resistance per blade over the entire path of the multi-blade rotary cutting tool can be easily calculated merely calculating the cutting resistance per blade at each of a plurality of machining points along the path of movement of the multi-blade rotary cutting tool.

The cutting resistance analysis device pertaining to the sixth aspect is the cutting resistance analysis device pertaining to the fifth aspect, wherein, when the cutting resistance per blade at an upstream machining point along the path of the multi-blade rotary cutting tool is less than the cutting resistance per blade at a downstream machining point, the cutting resistance interpolation section sets the cutting resistance per blade at a downstream machining point as the amount of cutting resistance per blade between this point and its adjacent machining point.

Here, the amount of cutting resistance per blade downstream is set as the amount of cutting resistance between adjacent machining points where the cutting resistance per blade is known to increase during machining, along the path of machining of the multi-blade rotary cutting tool.

Consequently, problems such as when the load on one blade of the multi-blade rotary cutting tool suddenly increases and damages the tool can be effectively prevented by using the larger downstream cutting resistance per blade as a reference for setting the cutting resistance between machining points where there is a possibility of a sudden increase in cutting resistance per blade during machining, for example.

The cutting and machining analysis device pertaining to the seventh aspect is the cutting and machining analysis device pertaining to any of the first to sixth aspects, further comprising a feed rate adjusting section that adjusts the feed rate of the multi-blade rotary cutting tool on the basis of the calculation result of the per-blade cutting resistance calculating section.

Here, the feed rate of the multi-blade rotary cutting tool is set on the basis of the amount of cutting resistance per blade calculated in the above-mentioned cutting resistance analysis device.

More specifically, when the cutting resistance at a given machining point is lower than a target value, for example, the feed rate of the multi-blade rotary cutting tool is raised so that the cutting resistance per blade will approach the target value. On the other hand, if the cutting resistance per blade at a given machining point is higher than a target value, the feed rate of the multi-blade rotary cutting tool is lowered so that the cutting resistance per blade will approach the target value.

Consequently, damage to the blades of the multi-blade rotary cutting tool can be prevented, while maximizing the machining efficiency in the cutting and machining process, by taking into account the amount of cutting resistance exerted per blade of the multi-blade rotary cutting tool, and raising or lowering the feed rate during cutting and machining with the multi-blade rotary cutting tool.

The cutting and machining device pertaining to the eighth aspect comprises the cutting resistance analysis device according to any of the first to seventh aspects, a positioning controlling section, a rate controlling section, and a machine tool section. The positioning controlling section positions the multi-blade rotary cutting tool with respect to the workpiece. The rate controlling section controls the feed rate of the multi-blade rotary cutting tool. The machine tool section cuts and machines the workpiece.

The cutting resistance analysis program pertaining to the ninth aspect analyzes cutting resistance from a workpiece in cutting and machining with a multi-blade rotary cutting tool, said cutting resistance analysis program causing a computer to execute a cutting resistance analysis method comprising the steps of calculating the amount of cutting resistance exerted on the multi-blade rotary cutting tool by using data related to the shape of the multi-blade rotary cutting tool, the number of blades, and the shape of the workpiece, calculating the number of blades of the multi-blade rotary cutting tool that are simultaneously in contact with the machining face of the workpiece, and calculating the cutting resistance per blade of the multi-blade rotary cutting tool on the basis of the amount of cutting resistance and the number of blades of the multi-blade rotary cutting tool.

Here, there is provided a cutting resistance analysis program for calculating the amount of cutting resistance per blade on the basis of the amount of cutting resistance at the contact portion, the number of blades of the multi-blade rotary cutting tool that are applied to the contact portion (arc portion), etc., in the cutting and machining of a workpiece with a multi-blade rotary cutting tool having a plurality of blades.

The amount of cutting resistance per blade here may be calculated at a specific machining point according to the shape of the workpiece and so forth, or may be calculated at a plurality of points along the path of movement of the multi-blade rotary cutting tool. That is, when the workpiece has a simple shape, there is almost no change in the amount of cutting resistance, so the cutting resistance per blade may be calculated at a single machining point, and when the workpiece has a complex shape, the cutting resistance per blade may be calculated at a plurality of machining points at which the amount of cutting resistance varies.

Consequently, in a cutting and machining step using a multi-blade rotary cutting tool, the feed rate of the multi-blade rotary cutting tool can be raised or lowered on the basis of the amount of cutting resistance per blade, thereby effectively preventing damage to the blades of the multi-blade rotary cutting tool, while also improving the machining efficiency in the cutting and machining step.

DESCRIPTION OF THE EMBODIMENTS

A cutting and machining device 10 equipped with the cutting resistance analysis device pertaining to an embodiment of the present invention will be described through reference to FIGS. 1 to 10.

Configuration of Cutting and Machining Device 10

Figure 1:
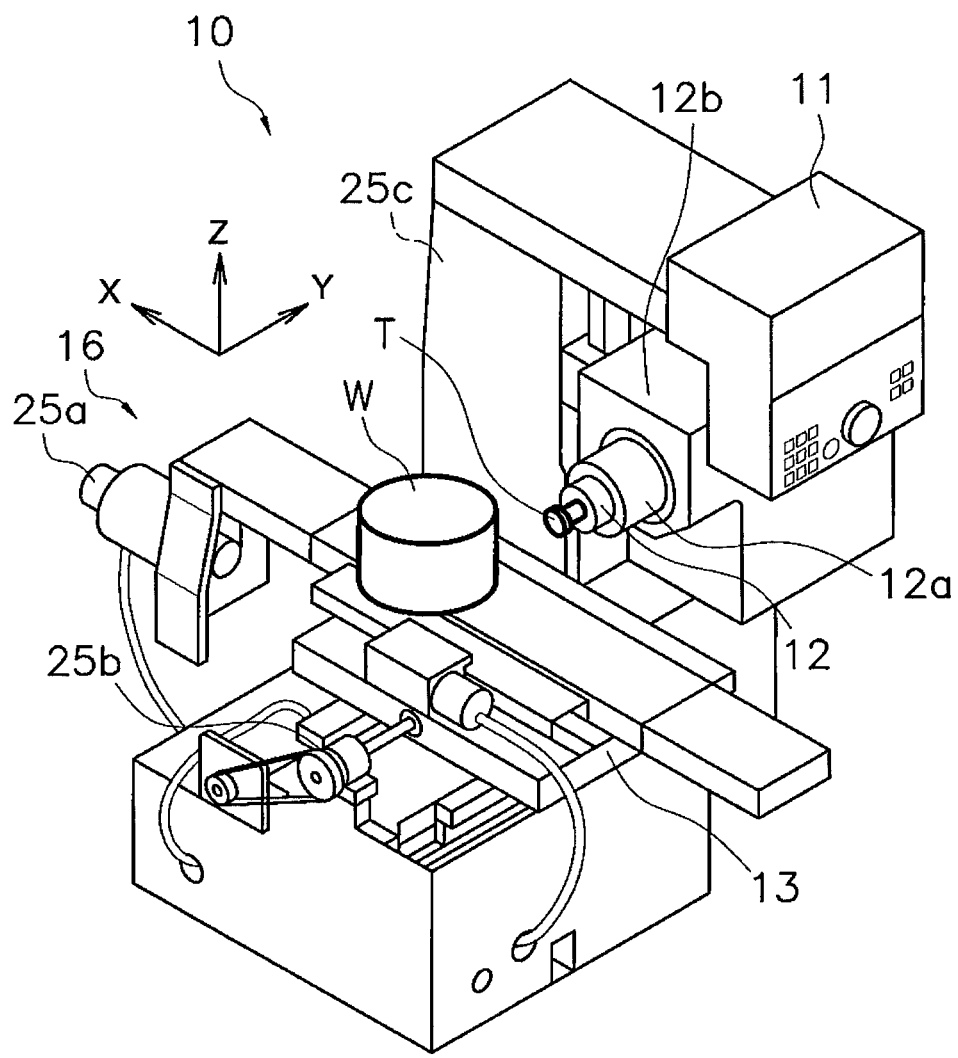
FIG. 1 is an oblique view of the configuration of a cutting and machining device equipped with the cutting resistance analysis device pertaining to an embodiment of the present invention.

The cutting and machining device 10 pertaining to this embodiment is used to cut and machine a workpiece composed of a metal material using a multi-blade rotary cutting tool (milling cutter T), and comprises a controller 11 (cutting resistance analysis device), a machine tool section 16, and so forth, as shown in FIG. 1.

The controller 11 refers to blank drawing 3D-CAD data stored in a memory 22a (data storage section; see FIG. 2), or an object NC program, tool shape information, or the like to perform the desired cutting and machining and to calculate the cutting resistance per blade by simulation prior to actual cutting and machining. The method for calculating cutting resistance per blade by this simulation will be discussed at a later point.

An NC program is expressed by G code for processing axial movement, the setting of coordinates, and so forth in the interior of the cutting and machining device 10. For example, G00 X200.0 Y150.0 moves the tool to the coordinates (200, 150). G01 X300.0 Y200.0 F60 moves the tool at a feed rate of 60 toward the coordinates (300, 200).

As shown in FIG. 1, the machine tool section 16 comprises a main shaft 12, a saddle 13, and so on, and cuts and machines a workpiece W into the desired shape.

As shown in FIG. 1, the main shaft 12 is attached to a main shaft head 12a, and the cutting and machining of the workpiece W is performed by rotating a milling cutter T (multi-blade rotary cutting tool) mounted at the distal end of this, under the rotary drive force of a servo motor 12b for main shaft rotation.

The saddle 13 is a seat on which the workpiece W is placed, and moves the workpiece W in the X and Y directions by rotating a ball screw 28 (see FIG. 2) or the like under the rotary drive force of servo motors 25a and 25b or the like. In this embodiment, the main shaft 12 is moved with respect to the workpiece W in the Z direction shown in FIG. 1 (the direction in which the tool moves up and down) by moving a column up and down with a servo motor 25c. The workpiece W is fixed on a table by a jig (not shown). Consequently, the workpiece W can be moved relative to the milling cutter T, so the workpiece W can be cut and machined into the desired shape.

Figure 2:
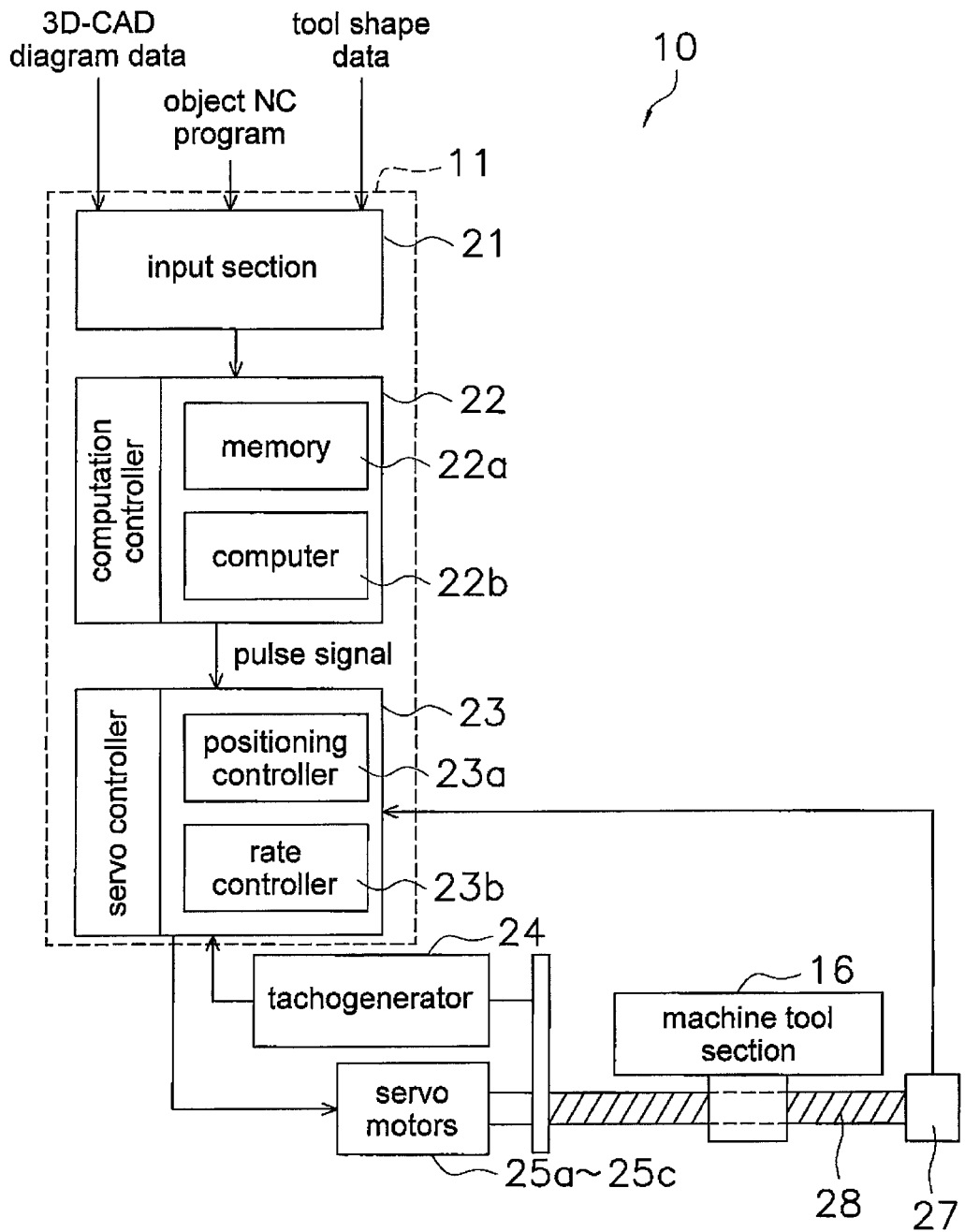
FIG. 2 is a block diagram of the configuration of control blocks formed within the cutting and machining device in FIG. 1.
Figure 3:
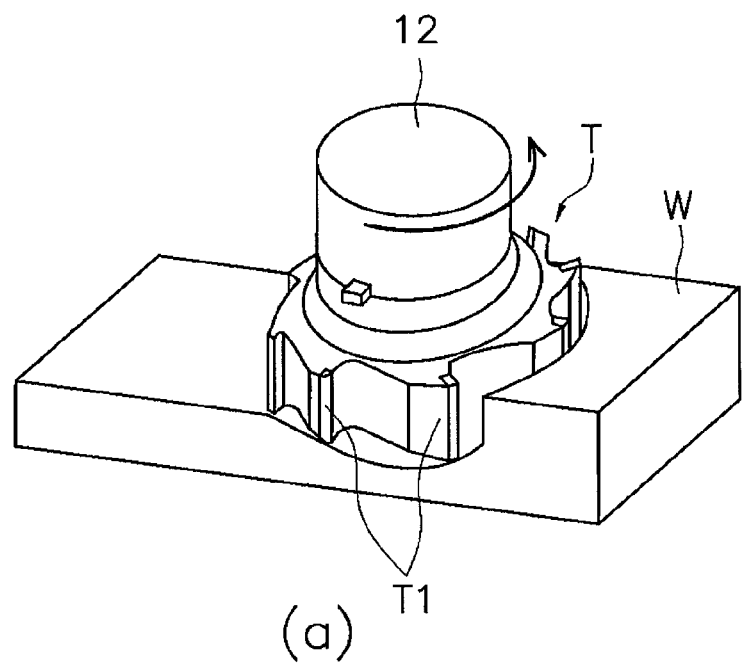
FIGS. 3(a) and 3(b) are an oblique view and a side view of the configuration of a milling cutter mounted in the cutting and machining device of FIG. 1.
Figure 3:
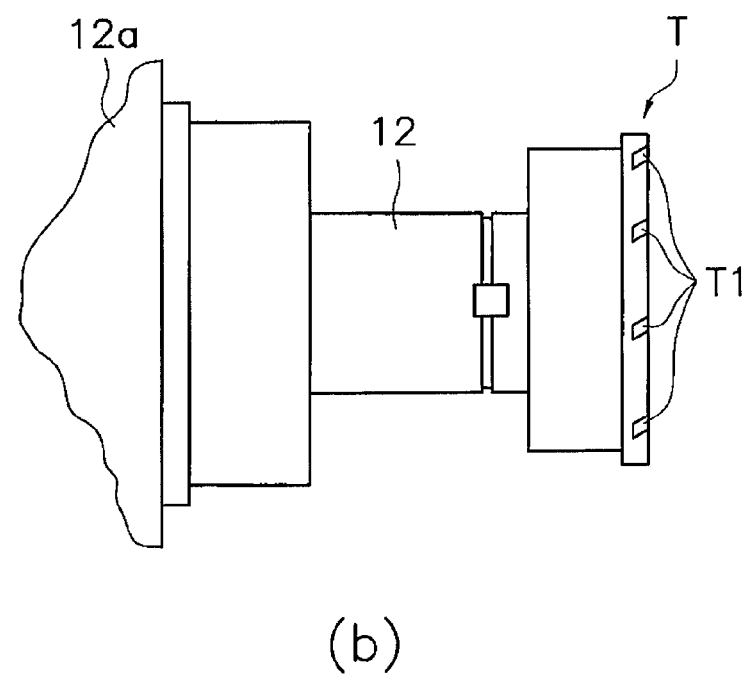

As shown in FIG. 2, the cutting and machining device 10 comprises an input section 21, a computation controller 22, and a servo controller 23 on the controller 11 side, and a tachogenerator 24, the servo motors 25a to 25c, and a position detector 27 on the machine tool section 16 side.

The input section 21 reads the content recorded to a known recording medium, such as a Floppy® disk or a flash memory, outputs the read information to the computation controller 22, and inputs various setting conditions and other such information from an operator.

The computation controller 22 controls the drive of the servo motors 25a to 25c by computing the relative feed rate of the milling cutter T with respect to the workpiece W, computing the relative position, performing interpolation (linear interpolation, circular interpolation), or the like on the basis of information sent from the input section 21. The computation controller 22 also has the memory 22a and a computer 22b.

As shown in FIG. 2, the memory 22a stores data for a diagram of the workpiece W after cutting and machining (a 3D-CAD diagram), an object NC program, information about the tool shape of the milling cutter T, and so forth, and this information can be read by the controller 11 to perform the desired cutting and machining at the machine tool section 16.

The computer 22b performs the computations necessary for cutting and machining (calculation of the feed rate, calculation of the relative position, interpolation, etc.) according to the various programs stored in the memory 22a on the basis of information read by the input section 21, and converts the computation results in a pulse signal and outputs it to the servo controller 23.

The servo controller 23 has a positioning controller 23a (one example of a positioning control section) and a rate controller 23b (one example of a rate control section), and controls the rotational speed of the servo motors 25a to 25c, etc., on the basis of the pulse signal outputted from the computation controller 22. The servo controller 23 also controls the rotation of the servo motors 25a to 25c while receiving a voltage value corresponding to the rotational speed of the servo motors 25a to 25c from the tachogenerator 24 (discussed below).

The positioning controller 23a performs cutting and machining while relatively moving the milling cutter T with respect to the workpiece W on the basis of the pulse signal received from the computation controller 22, and also performs feedback control of the servo motors 25a to 25c while comparing target position information with the current position information outputted from the position detector 27.

The rate controller 23b performs feedback control on the relative movement speed of the milling cutter T with respect to the workpiece W on the basis of the pulse signal received from the computation controller 22, while comparing the target rotational speed with the actual rotational speed of the servo motors 25a to 25c outputted from the tachogenerator 24.

The tachogenerator 24 is provided to each of the servo motors 25a to 25c, and detects the induced electromotive force produced by electromagnetic induction, and thereby detects the rotational speed of each of the servo motors 25a to 25c.

The servo motors 25a to 25c are drive sources for three-dimensionally moving the saddle 13 on which the workpiece W is placed, and is controlled by the servo controller 23.

The position detector 27 detects the position of the saddle 13, which moves three-dimensionally under the rotary drive force of the servo motors 25a to 25c, and outputs this position to the servo controller 23.

The type of material being cut, the tool, the cutting conditions, the machining difficulty, and other such cutting and machining command information is recorded, for example, to the above-mentioned Floppy® disk or flash memory.

Consequently, the controller 11 reads the information recorded to the Floppy® disk, etc., and the machine tool section 16 is used to carry out cutting and machining to manufacture the desired finished product W1 from the workpiece W.

Milling Cutter T

With the cutting and machining device 10 in this embodiment, as shown in FIGS. 3a and 3b, the cutting and machining of the workpiece W are performed using a milling cutter T (multi-blade rotary cutting tool) attached to the distal end of the main shaft 12.

The milling cutter T is a multi-blade rotary cutting tool having eight blades T1 (see FIG. 7b), and cuts and machines to the desired shape by moving relative to the workpiece W.

Control Blocks of Controller 11

Figure 4:
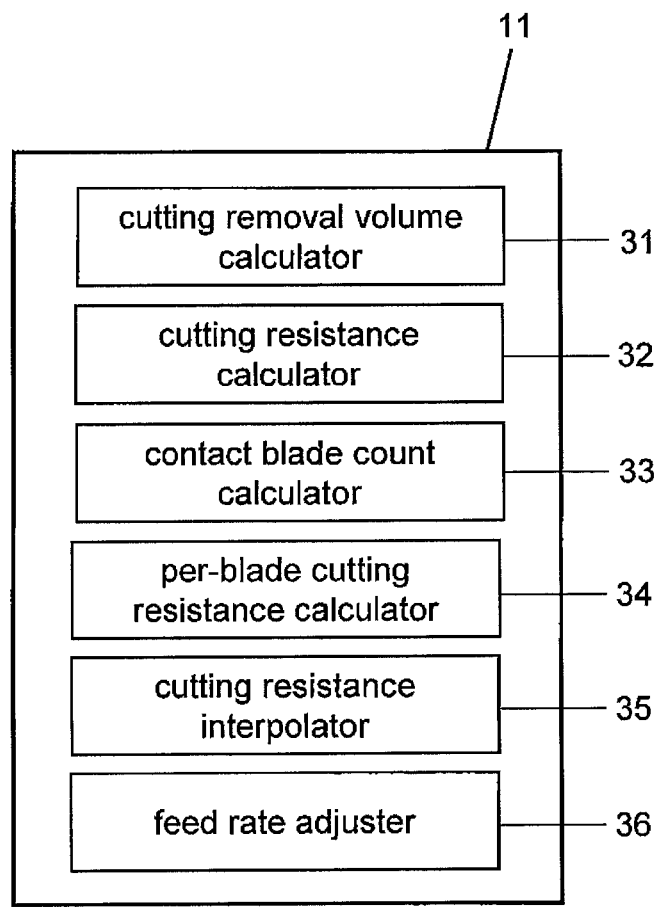
FIG. 4 is a block diagram of function blocks produced by the controller in FIG. 1.

With the cutting and machining device 10 in this embodiment, the various functions expressed by the function blocks shown in FIG. 4 (a cutting removal volume calculator 31, a cutting resistance calculator 32, a contact blade count calculator 33, a per-blade cutting resistance calculator 34, a cutting resistance interpolator 35, and feed rate adjuster 36) are executed by having the computer 22b shown in FIG. 2 read the various kinds of data and program stored in the memory 22a. In this embodiment, a simulation for finding the amount of cutting resistance per blade of the milling cutter T is carried out prior to the actual cutting and machining with these function blocks.

A cutting removal volume calculator 31 (one example of a cutting removal volume calculating section) calculates the volume of cutting removal of the contact portion C (see FIG. 7(c)) between the milling cutter T and the workpiece W at various machining points on the basis of the position, orientation, and so forth of the milling cutter T at various machining points along the path (tool path) of movement of the milling cutter T relative to the workpiece W.

The cutting resistance calculator 32 (one example of a cutting resistance calculating section) calculates the amount of cutting resistance exerted on the entire milling cutter T on the basis of the specific cutting resistance of the workpiece W and the cutting removal volume at various machining points as calculated by the cutting removal volume calculator 31.

The term "specific cutting resistance" refers to the cutting resistance per unit of removal volume that is inherent to each material. Here, the unit removal volume is decided by the cutting depth and the amount of feed of the tool, so the removal volume includes the parameters of the cutting depth and the amount of feed of the tool.

Cutting Resistance $F=Kr \times V$ (where $Kr$ is the specific cutting resistance and $V$ is the removal volume)

The contact blade count calculator 33 (one example of a contact blade count calculating section) calculates the number of blades that are substantially simultaneously in contact with the workpiece W at various machining points, out of the eight blades T1 included in the milling cutter T. More specifically, the number of blades T1 that enter the arc portion that is cut and machined by the rotation of the milling cutter T is calculated on the basis of the length of the arc portion, the diameter of the distal end portion of the milling cutter T, and the number of blades.

The per-blade cutting resistance calculator 34 (one example of a per-blade cutting resistance calculating section) calculates the amount of cutting resistance exerted per blade of the milling cutter T at the various machining points by dividing the cutting resistance calculated by the cutting resistance calculator 32 by the number of contact blades calculated by the contact blade count calculator 33 (see steps S1 to S14 below).

The cutting resistance interpolator 35 (one example of a cutting resistance interpolation section) calculates by linear interpolation the amount of cutting resistance between the various machining points on the basis of the amount of cutting resistance at the various machining points calculated by the per-blade cutting resistance calculator 34.

The feed rate adjuster 36 (one example of a feed rate adjusting section) adjusts the feed rate of the tool so that the amount of cutting resistance per blade at the various machining points is substantially the same as the target amount of cutting resistance per blade, on the basis of the amount of cutting resistance per blade at the various machining points calculated by the per-blade cutting resistance calculator 34 (see steps S21 to S30 below).

Flow of Simulation to Calculate Cutting Resistance Per Blade

Figure 5:
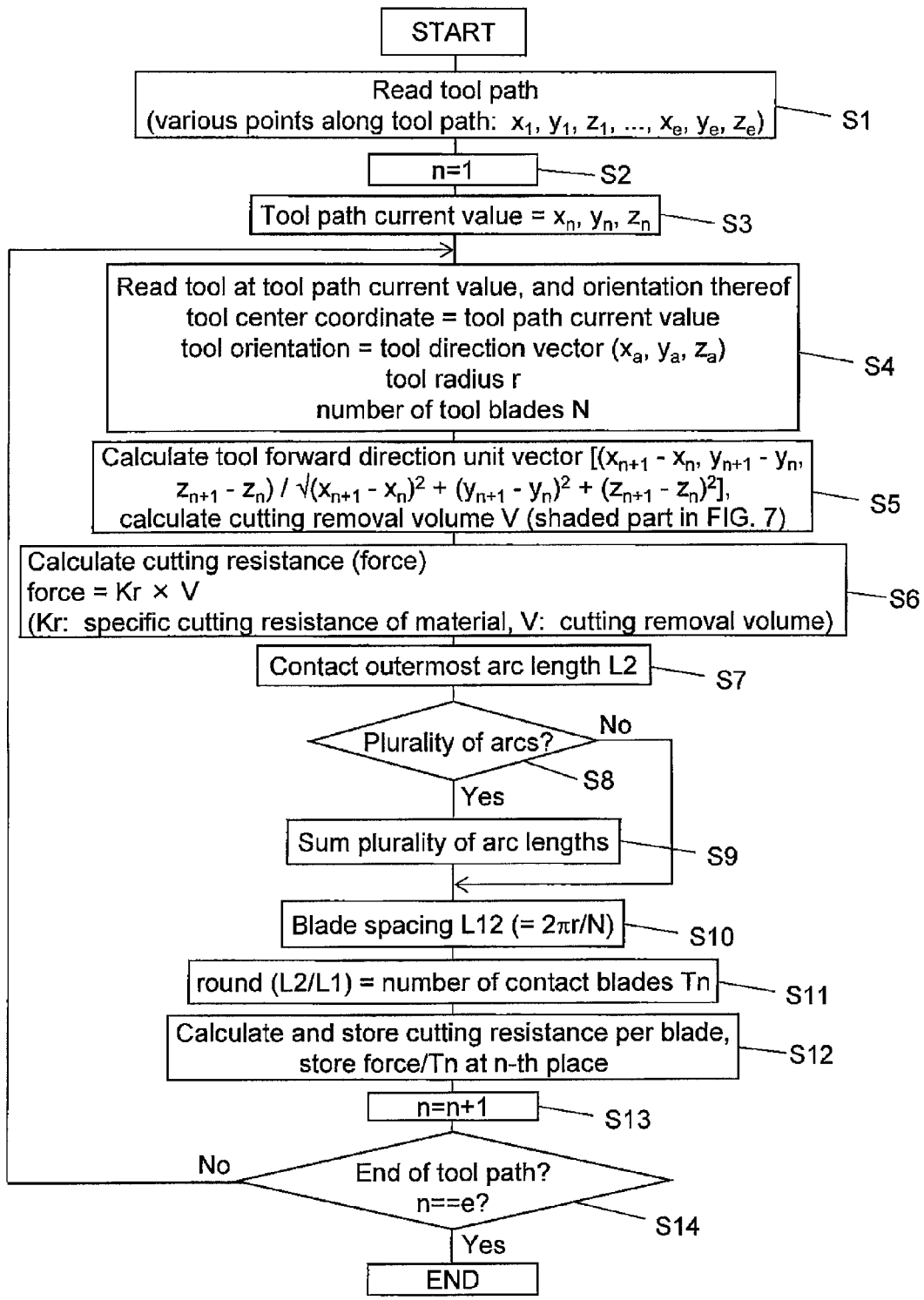
FIG. 5 is a flowchart of the flow of calculating the amount of cutting resistance per blade in a cutting resistance analysis simulation by the controller installed in the cutting and machining device in FIG. 1.

With the cutting and machining device 10 in this embodiment, a simulation is carried out according to the flowchart in FIG. 5, and the value of cutting resistance per blade of the blades T1 is calculated. The cutting and machining are premised on the tool feed rate and cutting depth being at a level such that machining can always be performed without damaging the blades.

As shown in FIG. 7a, with the cutting and machining device 10 in this embodiment, we will assume that the milling cutter T moves along the tool path and machines in a plane that is parallel to the tool direction vector (x, y, z). Also, in this embodiment, as shown in FIG. 7b, the number of blades T1 of the milling cutter T shall be assumed to be eight. As shown in FIG. 7c, the contact portion C between the workpiece W and the milling cutter T shall be decided by the forward direction and the inclination of the milling cutter T (tool).

FIGS. 7a and 7c are simplified diagrams, and to simplify the description, the cutter part of the milling cutter T is not depicted.

In step S1, the path of movement of the milling cutter T with respect to the workpiece W (the tool path) is read, and various machining points $((x_1, y_1, z_1), \ldots (x_n, y_n, z_n))$ along the tool path are set. The machining points are set at substantially regular intervals along the tool path of the workpiece W.

Figure 8:
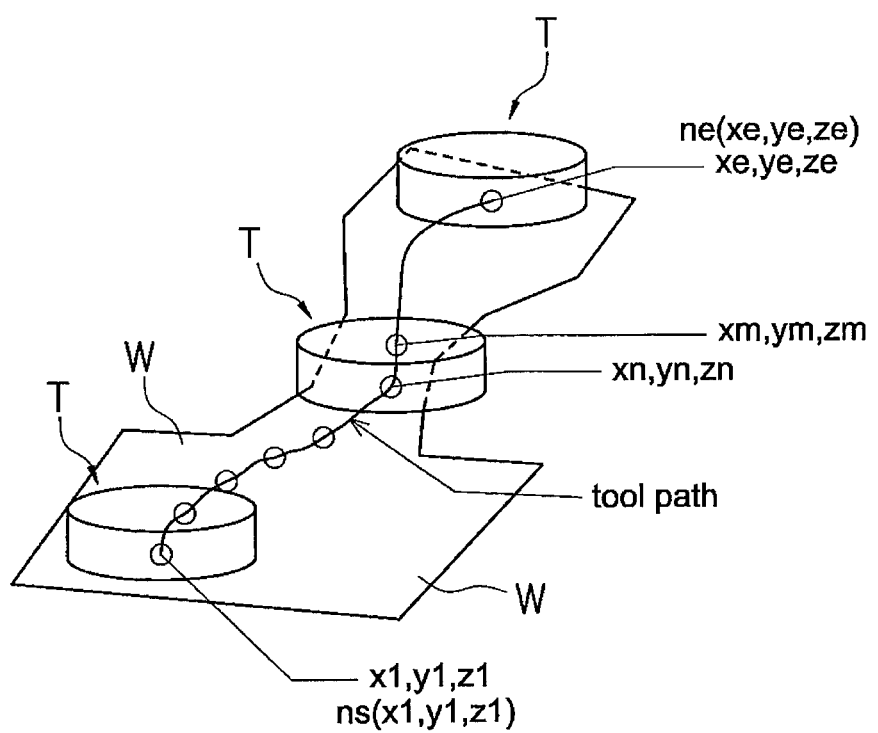
FIG. 8 is a concept diagram showing the positional relation between the workpiece and the milling cutter mounted in the cutting and machining device in FIG. 1.

In step S2, n=1 is inputted, and the initial position on the tool path is set as shown in FIG. 8.

In step S3, the current value on the tool path set for the workpiece W is assumed to be $(x_n, y_n, z_n$ (see FIG. 8).

In step S4, information related to the tool and the orientation of the tool at the current value of the tool path is read. More specifically, tool center coordinate=tool path current site, tool orientation=tool direction vector $(x_a, y_a, z_a)$, the tool radius r (see FIG. 7a), and number of tool blades N=8 are inputted.

In step S5, the tool forward direction unit vector is calculated, and the cutting removal volume V (the shaded part in FIG. 6) is calculated. The tool forward direction unit vector is calculated as follows.

$$(x_{n+1}-x_n, y_{n+1}-y_n, z_{n+1}-z_n)/\sqrt{\{(x_{n+1}-x_n)^2+(y_{n+1}-y_n)^2+(z_{n+1}-z_n)^2\}}$$

Figure 6:
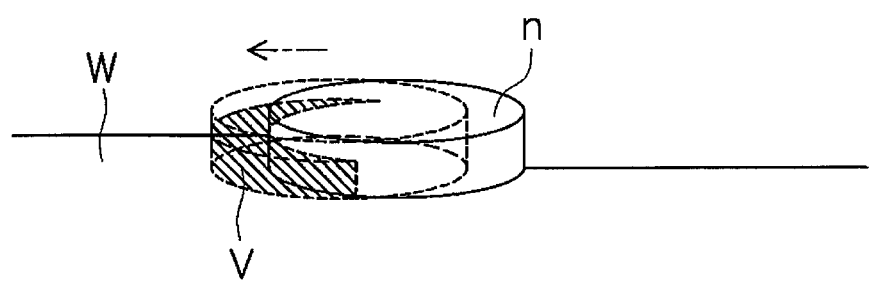
FIG. 6 is a concept diagram of cutting and machining according to the flowchart in FIG. 5.
Figure 7:
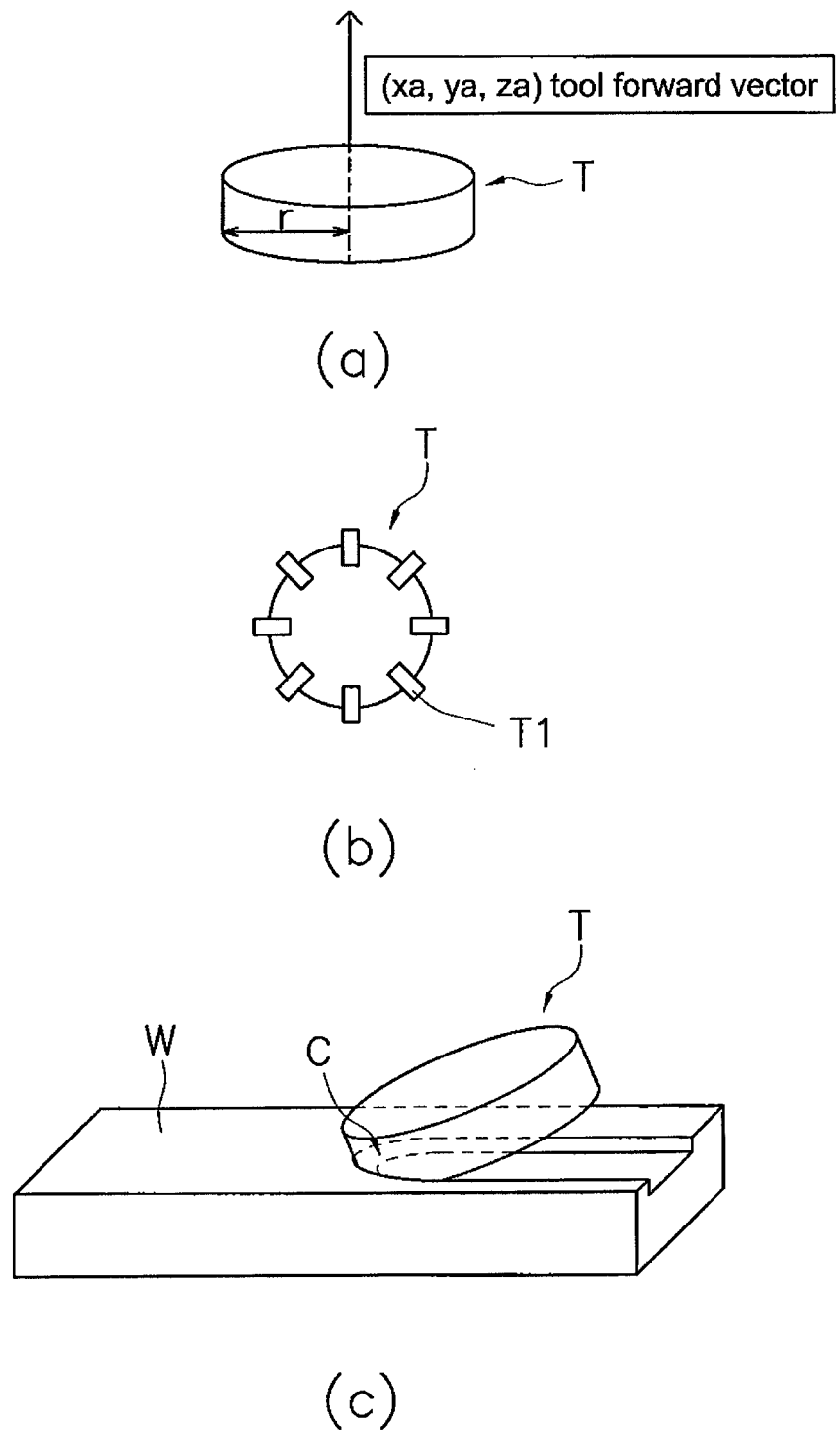
FIGS. 7(a) and 7(b) are a concept diagram and bottom view of a milling cutter mounted in the cutting and machining device in FIGS. 1, and 7(c) is an oblique view of the portion in contact with the workpiece.

The term "cutting removal volume," as shown by the shaded part in FIG. 6, refers to the volume that is cut away when the tool is moved a small amount, relative to the workpiece W, in the forward direction from the current value. In FIG. 6, to simplify the description, a state is illustrated in which the axis of the tool is perpendicular to the cutting face of the workpiece W.

In step S6, the amount of cutting resistance exerted on the milling cutter T at a given machining point is calculated. More specifically, if we let Kr be the specific cutting resistance of the material of the workpiece W, this is calculated by cutting resistance (force)=Kr×V.

In step S7, the outermost arc length L2 of the milling cutter T at the contact portion C of the above-mentioned machining point is calculated. The "outermost arc length" includes not only the arc portion where the tool and the workpiece W are actually in contact at the contact portion C (where the outermost arc is an arc that links the blade tips of the cutter), but also the length of the portion of an imaginary arc formed on the outside of this.

Figure 9:
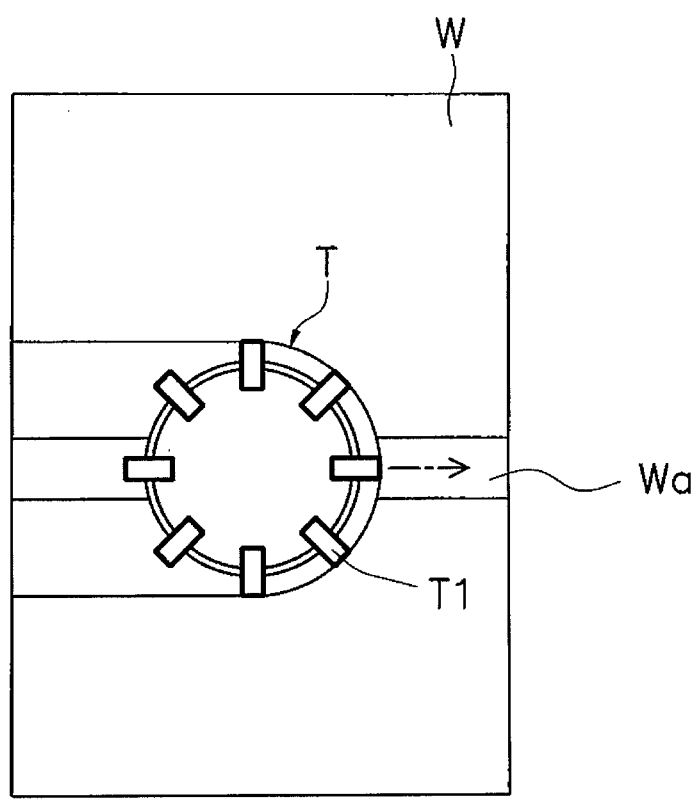
FIG. 9 is a plan view showing the positional relation between the milling cutter and the shape of the workpiece being cut and machined by the cutting and machining device in FIG. 1.
Figure 10:
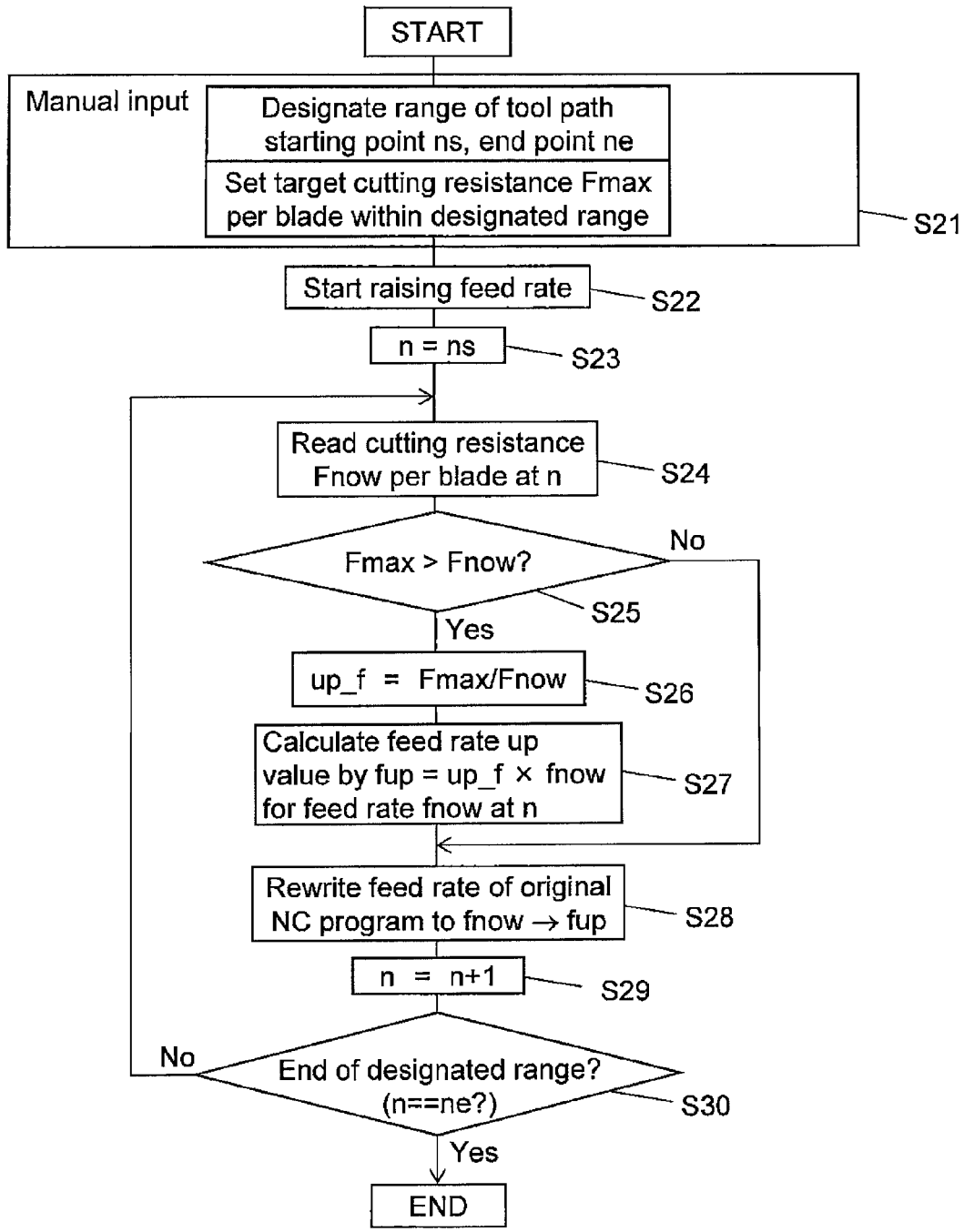
FIG. 10 is a flowchart of the flow of rewriting a cutting and machining program using a cutting resistance value calculated in the flow in FIG. 5.

In step S8, it is determined whether or not there are a plurality of arc portions in contact at the contact portion C of the above-mentioned machining point. Here, if there are a plurality of arc portions at the contact portion C, this means a state in which the portion of the workpiece W where a groove Wa is formed along the tool path is cut and machined, for example, as shown in FIG. 9. If it is determined that there are a plurality of arc portions, the flow proceeds to step S9, but if it is determined that there are not a plurality of arc portions (that is, if there is just one), the flow proceeds to step S11.

In step S9, since it was determined in step S8 that there are a plurality of arc portions, it is determined that there is contact with only the downstream arc portion in the forward direction along the tool path, just the downstream arc portion is selected, and the contact portion C is calculated. This is because the upstream arc portion along the tool path has already been cut and machined, and the blades T1 of the milling cutter T are not believed to be in contact during actual machining.

In step S10, the spacing L1 of the blades T1 of the milling cutter T in the peripheral direction is calculated on the basis of the number of blades T1 of the milling cutter T. In this embodiment, since there are eight blades of the milling cutter T, the spacing L1 is the quotient of dividing the outer periphery of the milling cutter T ($2\pi r$) by 8.

In step S11, the number of contact blades Tn of the milling cutter T at the contact portion C on the workpiece W at a given machining point is calculated on the basis of the outermost arc length L2 calculated in step S7 and the spacing L1 of the blades T1 in the peripheral direction calculated in step S10. More specifically, the number of contact blades Tn is the numerical value of the integer portion of the quotient obtained by dividing the outermost arc length L2 by the spacing L1 of the blades T1.

In step S12, the cutting resistance per blade at a given machining point is calculated and stored. More specifically, the cutting resistance per blade at the n-th machining point is calculated as the quotient of dividing the cutting resistance (force) calculated in step S6 by the number of contact blades Tn.

In step S13, we let n=n+1, and move to a step of calculating the cutting resistance per blade at the next machining point.

In step S14, it is determined whether or not the end of the tool path has been reached. More specifically, the processing of steps S3 to S13 is repeated until n=e, that is, until the end of the tool path is reached.

The cutting resistance per blade between machining points is calculated by linear interpolation of the cutting resistance per blade at an adjacent machining point by the above-mentioned cutting resistance interpolator 35.

If the different in the value of the cutting resistance per blade at the adjacent machining point is over a specific threshold, control may be performed as follows rather than simply finding the amount of cutting resistance between machining points by linear interpolation.

Specifically, if the cutting resistance per blade at the upstream machining point along the path of movement of the milling cutter T (the tool path) is less than the cutting resistance per blade at the downstream machining point, then the amount of cutting resistance per blade at the downstream machining point is set as the amount of cutting resistance per blade at the adjacent machining point.

In this embodiment, the amount of cutting resistance per blade of the milling cutter T (a multi-blade rotary cutting tool) can be detected by performing the above simulation.

Flow of Cutting and Machining Program Production

In this embodiment, the NC program used in actual cutting and machining is produced by conducting the following simulation according to the flowchart shown in FIG.

10, on the basis of the amount of cutting resistance per blade calculated as a result of the above simulation.

In step S21, the range of the tool path (the starting point ns and end point ne) is designated by manual input from the operator, and the target cutting resistance per blade Fmax within the designated range is set. For example, the target cutting resistance per blade Fmax is obtained by setting the maximum value of the cutting resistance per blade at the various machining points $(x_1, y_1, z_1), \ldots, (x_n, y_n, z_n)$ found previously.

In step S22, the relative movement speed of the milling cutter T with respect to the workpiece W is steadily raised.

In step S23, ns, which means the starting point of the tool path, is inputted as n.

In step S24, the value of the cutting resistance per blade Fnow at the machining point n calculated as a result of the above simulation.

In step S25, it is determined whether or not the value of the cutting resistance per blade Fnow at the machining point n is less than the target cutting resistance per blade Fmax set by the operator in step S21. If it is determined here that the value of the cutting resistance per blade Fnow is less than the target cutting resistance per blade Fmax, the flow proceeds to step S26, and if it is determined to be greater, the flow proceeds to step S28.

Specifically, in step S25, it is confirmed whether or not the cutting resistance per blade Fnow at the machining point n has exceeded the target cutting resistance per blade Fmax set as the upper limit, and if it has exceeded this limit, the feed rate of the milling cutter T with respect to the workpiece W is lowered so that the amount of cutting resistance per blade Fnow will be substantially the same as the target cutting resistance per blade Fmax. On the other hand, if the cutting resistance per blade Fnow less than the target cutting resistance per blade Fmax, the feed rate of the milling cutter T with respect to the workpiece W is raised so that the amount of cutting resistance per blade Fnow will be substantially the same as the target cutting resistance per blade Fmax. A specific example of the setting content is given below.

In step S26, since it was determined in step S25 that the cutting resistance per blade Fnow is less than the target cutting resistance per blade Fmax, the proportional increase in cutting resistance (upf) is calculated according to the ratio between Fmax and Fnow (Fmax/Fnow).

In step S27, the above-mentioned proportional increase (upf) is multiplied by the feed rate fnow of the milling cutter T with respect to the workpiece W at the machining point n, and the feed rate up value (fup) is calculated.

In step S28, the feed rate set by the original NC program is rewritten from fnow to fup.

In step S29, we let n=n+1, and move to a step of calculating the feed rate at the next machining point.

In step S30, it is determined whether or not the end point of the tool path has been reached. More specifically, steps S24 to S29 are repeated until n=e, that is, until the end point of the tool path has been reached.

In this embodiment, the relative movement rate of the milling cutter T with respect to the workpiece W can be adjusted so that the amount of cutting resistance per blade is substantially the same at each machining point, by producing a cutting and machining program with which the above-mentioned results of simulating analysis of cutting resistance per blade is used to perform actual machining.

As a result, the feed rate can be controlled so that the load per blade exerted on the blades T1 of the milling cutter T does not exceed the target value, which prevents damage to the blades T1 of the milling cutter T, and the feed rate can be controlled so that the load per blade will be substantially the target value, which allows the feed rate to be raised to its limit, and this improves the efficiency of cutting and machining over that in the past.

Other Embodiments

An embodiment of the present invention was described above, but the present invention is not limited to or by the above embodiment, and various modifications are possible without departing from the gist of the invention.

(A) In the above embodiment, an example was given in which the present invention was worked as a cutting resistance analysis device (the controller 11) and the cutting and machining device 10, but the present invention is not limited to this.

For example, the present invention may be worked as the above-mentioned cutting resistance analysis program for calculating the cutting resistance per blade, and a non-transitory recording medium in which this program is stored.

(B) In the above embodiment, an example was given in which cutting and machining were performed using the milling cutter T as the multi-blade rotary cutting tool, but the present invention is not limited to this.

For example, the present invention can also be applied when cutting and machining are performed using an end mill or other such multi-blade rotary cutting tool.

(C) In the above embodiment, an example was given in which cutting and machining were performed using a multi-blade rotary cutting tool (the milling cutter T) having eight blades, but the present invention is not limited to this.

For example, as long as it has at least two blades, the multi-blade rotary cutting tool may have any number of blades.

(D) In the above embodiment, an example was given in which the amount of cutting resistance was found on the basis of the specific cutting resistance Kr and the cutting removal volume V calculated by the cutting removal volume calculator 31, but the present invention is not limited to this.

For example, the relation of cutting resistance to tool cutting depth and feed amount may be mapped as a table in a memory, and the cutting resistance found from the cutting depth and feed amount at the current values. That is, when the amount of cutting resistance is calculated, it may be found directly, on the basis of the tool cutting depth and feed amount, without calculating the cutting removal volume.

(E) In the above embodiment, an example was given in which the controller 11 of the cutting and machining device 10 performed analysis of the cutting resistance per blade, but the present invention is not limited to this.

For example, the above-mentioned cutting resistance analysis program for calculating cutting resistance per blade may be installed in a computer that is external to the cutting and machining device 10, a simulation executed using 3D-CAD diagram data and tool shape data, and the NC program produced as a result this transferred to the input component of the cutting and machining device 10.

The cutting resistance analysis device of the illustrated embodiment has the effect of reliably preventing damage to a multi-blade tool while also improving machining efficiency, and therefore can be widely applied to cutting and machining devices that perform various kinds of cutting and machining.

The invention claimed is:

1. A cutting resistance analysis device adapted to calculate cutting resistance at a plurality of machining points along a path of movement of a multi-blade rotary cutting tool in cutting and machining of a workpiece using the multi-blade rotary cutting tool, the cutting resistance analysis device comprising:
- a data storage section configured to store data related to a shape of the multi-blade rotary cutting tool, a number of blades, and a shape of the workpiece;
- a cutting resistance calculating section configured to calculate an amount of cutting resistance exerted on the multi-blade rotary cutting tool at a plurality of machining points;
- a contact blade count calculating section configured to calculate a number of blades of the multi-blade rotary cutting tool that are simultaneously in contact with a machining face of the workpiece at the plurality of machining points;
- a per-blade cutting resistance calculating section configured to calculate a cutting resistance per blade of the multi-blade rotary cutting tool at the plurality of machining points based on the amount of cutting resistance and a calculation result of the contact blade count calculating section at each of the machining points; and
- a cutting resistance interpolation section configured to calculate by linear interpolation the cutting resistance per blade between machining points based on the amount of cutting resistance per blade at a prescribed machining point calculated by the per-blade cutting resistance calculator and the amount of cutting resistance per blade at a machining point adjacent to the prescribed machining point,
- the cutting resistance interpolation section being further configured such that when the cutting resistance per blade at an upstream machining point along the path of the multi-blade rotary cutting tool is less than the cutting resistance per blade at a downstream machining point, the cutting resistance interpolation section sets the cutting resistance per blade at the downstream machining point as the amount of cutting resistance per blade between the downstream machining point and an adjacent machining point to the downstream machining point.

2. The cutting resistance analysis device according to claim 1, further comprising
a cutting removal volume calculating section configured to use various kinds of data stored in the data storage section to calculate a cutting removal volume by the multi-blade rotary cutting tool at a prescribed machining point along the path of the multi-blade rotary cutting tool,
wherein the cutting resistance calculating section is configured to calculate the amount of cutting resistance exerted on the multi-blade rotary cutting tool based on a specific cutting resistance that is inherent to the workpiece and the cutting removal volume calculated by the cutting removal volume calculating section.

3. The cutting resistance analysis device according claim 1, wherein
the contact blade count calculating section is configured to calculate the number of blades of the multi-blade rotary cutting tool that are simultaneously in contact with the machining face of the workpiece based on an outermost arc length at a contact portion between the multi-blade rotary cutting tool and the workpiece.

4. The cutting resistance analysis device according to claim 1, wherein
the per-blade cutting resistance calculating section is configured to calculate the cutting resistance per blade at a plurality of machining points disposed at regular intervals along the path of the multi-blade rotary cutting tool.

5. The cutting and machining analysis device according to claim 1, further comprising
a feed rate adjusting section configured to adjust a feed rate of the multi-blade rotary cutting tool based on the calculation result of the per-blade cutting resistance calculator.

6. A cutting and machining device comprising:
the cutting resistance analysis device according to claim 1;
a positioning control section configured to position the multi-blade rotary cutting tool with respect to the workpiece;
a rate control section configured to control a feed rate of the multi-blade rotary cutting tool; and
a machine tool section configured and arranged to cut and machine the workpiece.

7. A non-transitory computer readable medium storing a cutting resistance analysis program that analyzes cutting resistance from a workpiece in cutting and machining with a multi-blade rotary cutting tool, the cutting resistance analysis program causing a computer to execute a cutting resistance analysis method comprising:
calculating an amount of cutting resistance exerted on the multi-blade rotary cutting tool by using data related to a shape of the multi-blade rotary cutting tool, a number of blades, and a shape of the workpiece at a plurality of machining points;
calculating a number of contact blades of the multi-blade rotary cutting tool that are simultaneously in contact with a machining face of the workpiece at the plurality of machining points;
calculating a cutting resistance per blade of the multi-blade rotary cutting tool at the plurality of machining points based on the amount of cutting resistance and the number of contact blades of the multi-blade rotary cutting tool at each of the machining points;
calculating by linear interpolation the cutting resistance per blade between machining points based on the calculated amount of cutting resistance per blade at a prescribed machining point and the amount of cutting resistance per blade at a machining point adjacent to the prescribed machining point; and
when the cutting resistance per blade at an upstream machining point along the path of the multi-blade rotary cutting tool is less than the cutting resistance per blade at a downstream machining point, setting the cutting resistance per blade at the downstream machining point as the amount of cutting resistance per blade between the downstream machining point and an adjacent machining point to the downstream machining point.

* * * * *